(12) United States Patent
D'Aurelio et al.

(10) Patent No.: US 9,582,601 B2
(45) Date of Patent: *Feb. 28, 2017

(54) COMBINING SERVER-SIDE AND CLIENT-SIDE USER INTERFACE ELEMENTS

(71) Applicant: Microsoft Technology Licensing, LLC, Redmond, WA (US)

(72) Inventors: Ryan James D'Aurelio, Seattle, WA (US); Mark John Sawrey Leece, Bellevue, WA (US); Zachariah Glen Johnson, Woodinville, WA (US); Douglas Duane Berrett, Seattle, WA (US); Sean Kollenkark, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/584,881

(22) Filed: Dec. 29, 2014

(65) Prior Publication Data
US 2015/0120823 A1    Apr. 30, 2015

Related U.S. Application Data

(63) Continuation of application No. 13/587,863, filed on Aug. 16, 2012, now Pat. No. 8,959,142.
(Continued)

(51) Int. Cl.
*G06F 15/16*     (2006.01)
*G06F 17/30*     (2006.01)
(Continued)

(52) U.S. Cl.
CPC ........ *G06F 17/30893* (2013.01); *G06F 15/16* (2013.01); *G06F 17/2241* (2013.01);
(Continued)

(58) Field of Classification Search
CPC ........... G06F 9/4443; G06F 17/00; G06F 3/00
(Continued)

(56) References Cited

U.S. PATENT DOCUMENTS 6,404,445 B1   6/2002  Galea et al.
6,493,871 B1  12/2002  McGuire et al.
(Continued)

OTHER PUBLICATIONS

"DB2 Connect and Application Servers," Retrieved on: Jul. 19, 2012, Available at: http://publib.boulder.ibm.com/infocenter/db2luw/v8/index.jsp?topic=/com.ibm.db2.udb.doc/conn/c0004784.htm, 3 pages.
(Continued)

*Primary Examiner* — Tauqir Hussain
(74) *Attorney, Agent, or Firm* — Daniel Choi; Micky Minhas

(57) ABSTRACT

A method and apparatus are disclosed for combining server-supplied user interface elements with client-supplied user interface elements. The server-supplied user interface elements can be received by a client device and inserted into a client-supplied object model, such as a Document Object Model (DOM). The object model can then be used to render a page, such as a webpage. By injecting server-supplied user interface elements into a client object model, the client can intelligently combine UI elements from a server with UI elements from a client. In the situation where there are conflicting or overlapping UI elements, the client device can modify the object model to eliminate such conflicts or overlaps.

17 Claims, 6 Drawing Sheets

Related U.S. Application Data

(60) Provisional application No. 61/605,119, filed on Feb. 29, 2012.

(51) Int. Cl.
  *G06F 17/22* (2006.01)
  *H04L 29/08* (2006.01)
  *H04L 29/06* (2006.01)
  *G06F 21/00* (2013.01)
  *G06F 3/048* (2013.01)

(52) U.S. Cl.
  CPC .......... *H04L 67/2857* (2013.01); *H04L 67/42* (2013.01); *G06F 3/048* (2013.01); *G06F 21/00* (2013.01)

(58) Field of Classification Search
  USPC ........................................... 709/203
  See application file for complete search history.

(56) References Cited

U.S. PATENT DOCUMENTS

| | | | |
|---|---|---|---|
| 6,567,104 B1 | 5/2003 | Andrew et al. | |
| 6,983,421 B1 | 1/2006 | Lahti et al. | |
| 7,051,069 B2 | 5/2006 | Smithline et al. | |
| 7,058,944 B1 | 6/2006 | Sponheim et al. | |
| 7,478,381 B2 | 1/2009 | Roberts et al. | |
| 7,712,025 B2* | 5/2010 | Roessler | G06F 17/30899 711/118 |
| 7,853,943 B2 | 12/2010 | McCaleb et al. | |
| 7,895,173 B1 | 2/2011 | Dedu-Constantin et al. | |
| 8,146,069 B2 | 3/2012 | Shamilian et al. | |
| 8,533,347 B1* | 9/2013 | Eisinger | G06F 17/30861 709/223 |
| 2001/0044738 A1 | 11/2001 | Elkin et al. | |
| 2004/0024843 A1* | 2/2004 | Smith | G06F 9/4443 709/219 |
| 2005/0021791 A1 | 1/2005 | Sakiyama et al. | |
| 2005/0131962 A1* | 6/2005 | Deshpande | G06F 17/30244 |
| 2005/0289156 A1* | 12/2005 | Maryka | G06F 17/30905 |
| 2006/0047693 A1 | 3/2006 | Kojima et al. | |
| 2006/0265662 A1 | 11/2006 | Gertzen | |
| 2007/0244990 A1 | 10/2007 | Wells | |
| 2008/0082604 A1 | 4/2008 | Mansour et al. | |
| 2008/0189235 A1 | 8/2008 | Mital et al. | |
| 2009/0144632 A1 | 6/2009 | Mendez | |
| 2009/0183145 A1 | 7/2009 | Hu et al. | |
| 2009/0300496 A1 | 12/2009 | Fan et al. | |
| 2010/0100823 A1 | 4/2010 | Ewe et al. | |
| 2010/0146481 A1 | 6/2010 | Binder et al. | |
| 2010/0281107 A1 | 11/2010 | Fallows et al. | |
| 2010/0313248 A1 | 12/2010 | Krivosheev et al. | |
| 2010/0318987 A1 | 12/2010 | Barr et al. | |
| 2011/0321027 A1 | 12/2011 | Andrews et al. | |
| 2012/0072548 A1 | 3/2012 | Kim | |
| 2012/0167063 A1 | 6/2012 | Detwiler et al. | |
| 2012/0216132 A1* | 8/2012 | Bockus | G06F 17/30873 715/760 |
| 2013/0226994 A1 | 8/2013 | D'Aurelio et al. | |
| 2013/0227539 A1 | 8/2013 | D'Aurelio et al. | |
| 2013/0227657 A1 | 8/2013 | D'Aurelio et al. | |
| 2014/0059528 A1 | 2/2014 | Gagliardi | |

OTHER PUBLICATIONS

"Expression Blend® 4," Published on: Nov. 10, 2010, Available at: http://www.microsoft.com/expression/products/Blend_Overview.aspx, 3 pages.

Fraternali, et al., "Rich Internet Applications," In Proceedings of IEEE Internet Computing, vol. 14, May 2010, 4 pages.

"Introducing Host Access Transformation Services," Retrieved on: Jul. 19, 2012, Available at: http://publib.boulder.ibm.com/infocenter/hatshelp/v75/index.jsp?topic=/com.ibm.hats.doc/doc/gsintro.htm, 13 pages.

"Kendo UI," Retrieved on: Jul. 19, 2012, Available at: http://www.kendoui.com/web.aspx, 7 pages.

"Molu Software Update," Retrieved on: Apr. 11, 2012, Available at: http://www.mophilly.com/kb/index.php/Molu_Software_Update, 6 pages.

* cited by examiner software 680 implementing one or more
innovations for updating client applications

COMBINING SERVER-SIDE AND CLIENT-SIDE USER INTERFACE ELEMENTS

CROSS REFERENCE TO RELATED APPLICATION

This application is a continuation of U.S. patent application Ser. No. 13/587,863, filed Aug. 16, 2012, which claims priority from U.S. Provisional Application No. 61/605,119, filed Feb. 29, 2012, which applications are incorporated herein by reference in their entirety.

BACKGROUND

The Document Object Model (DOM) is an application programming interface (API) for HTML and XML documents. It defines the logical structure of documents and ways for documents to be accessed and manipulated. One objective for DOM is to provide a standard programming interface that can be used in a wide variety of environments and applications. Generally, DOM provides a hierarchical tree structure having a plurality of nodes in parent/child relationships. Using this structure, script programs can examine and dynamically change a web page.

Other languages can be associated with object models different than DOM. However, whatever model is used, it is desirable to allow programmers to build documents, navigate their structure, and add, modify, or delete elements and content.

Even with well-defined object models, authoring pages that can be used across different platforms can be challenging. For example, different pages often need to be created based on whether the page is to be displayed on a server or a client, despite an overlap in content between the pages. In one simple example, a server-side page can display headers and footers that are not displayed on a client page. In such a situation, two different pages need to be created even if the content is the same.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method and apparatus are disclosed for combining server-supplied user interface elements with client-supplied user interface (UI) elements. The server-supplied user interface elements can be received by a client device and inserted into a client-supplied object model, such as a Document Object Model (DOM). The object model can then be used to render a page, such as a webpage.

By injecting server-supplied user interface elements into a client object model, the client can intelligently combine UI elements from a server with UI elements from a client. In the situation where there are conflicting or overlapping UI elements, the client device can modify the object model to eliminate such conflicts or overlaps. Thus, the client's access to user information stored on the client device can be used to modify server-supplied UI elements. Additionally, by being able to dynamically modify the object model, a page can be created for different platforms and then modified in the object model.

The foregoing and other objects, features, and advantages of the invention will become more apparent from the following detailed description, which proceeds with reference to the accompanying figures.

DETAILED DESCRIPTION

Figure 1:
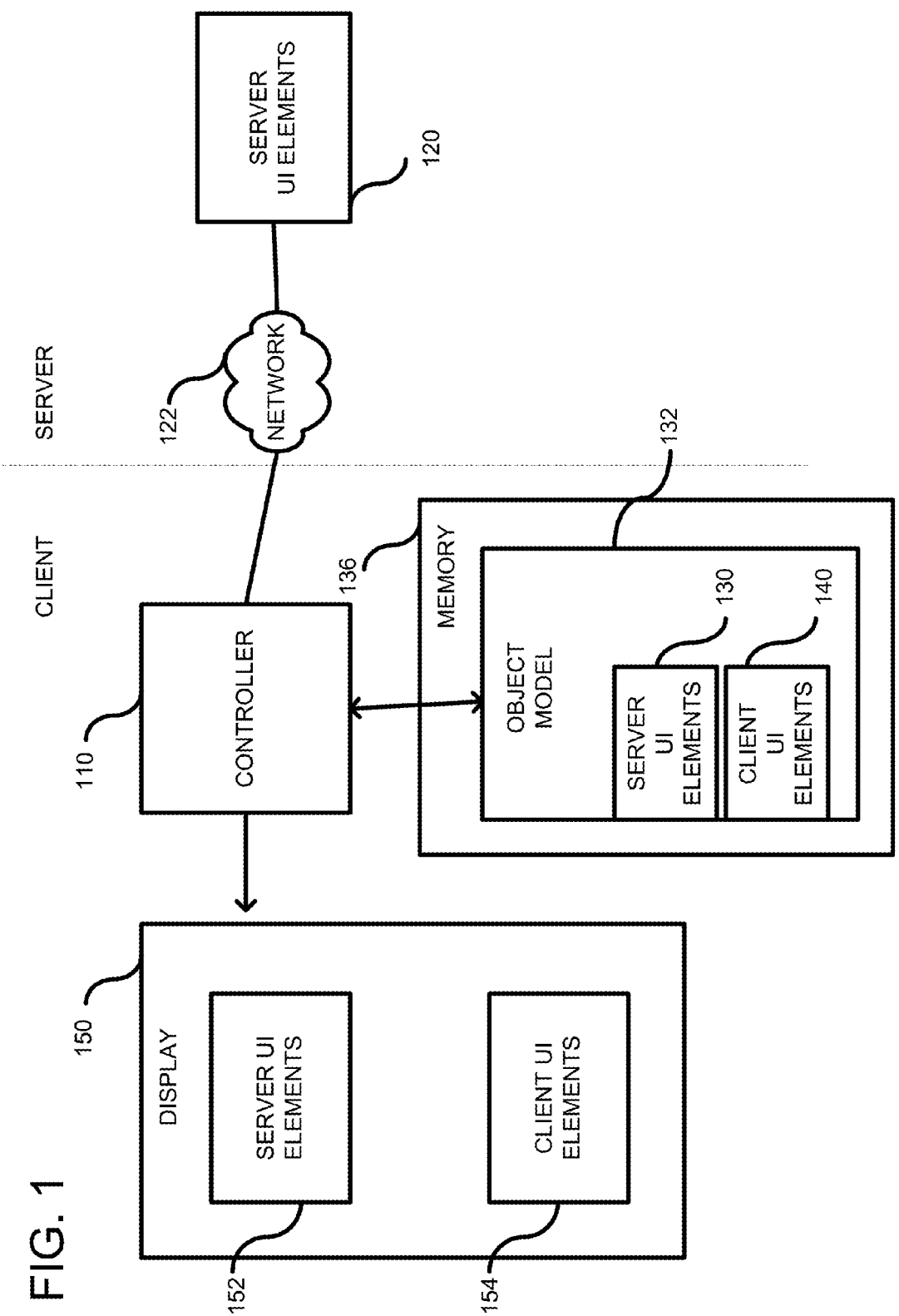
FIG. 1 shows an example architecture that can be used where client-supplied UI elements and server-supplied UI elements are combined in a client object model.

FIG. 1 illustrates an exemplary system that can be used for implementing embodiments described herein. A controller 110 (e.g., processor, FPGA, microcontroller, etc.) can receive user interface (UI) elements from a server computer 120 via a network 122, such as the Internet. The UI elements can include icons, menus, controls (e.g., text boxes, buttons, hyperlinks, drop-down lists, check boxes, radio buttons, etc.), commands, content, etc. The received UI elements 130 can be inserted into an object model 132 stored in memory 136 on a client device. In the case where the UI elements are in HTML, the object model 132 can be a Document Object Model (DOM). Although the description generally uses HTML, XML and DOM as examples, it is understood that the embodiments herein are not limited to those specific languages and object models. Rather, any markup language and object model can be used. The controller 110 can blend the UI elements 130 from the server with client UI elements 140 in the same object model 132. Being in the same object model allows a script or other program executing on the controller 110 to manipulate the server UI elements 130 and the client UI elements 140 in a like manner. Additionally, style information from the server can be applied to any rendered page. Using the object model 132, the controller 110 can assist in rendering on a display 150 (a separate renderer can also be used) a combination of the server UI elements 152 and client UI elements 154 obtained from the object model. The controller 110 can check whether the network 122 is connected to the client device and make intelligent decisions about formatting the display 150 through manipulation of the object model 132. For example, some or all of the server UI elements 130 can be suppressed if there is not a network connection. Additionally, the area on the display 150 can be expanded for the client UI elements 154. In an offline mode, previously cached server responses stored in local memory or disk on the client device can be used.

It will be understood by those skilled in the art that building an object model on the client device using server-supplied UI elements and client-supplied UI elements is fundamentally different than simply rendering a page that pulls in images or text from a server computer, as such images or text are not copied to the object model and cannot be manipulated by a client script.

Figure 2:
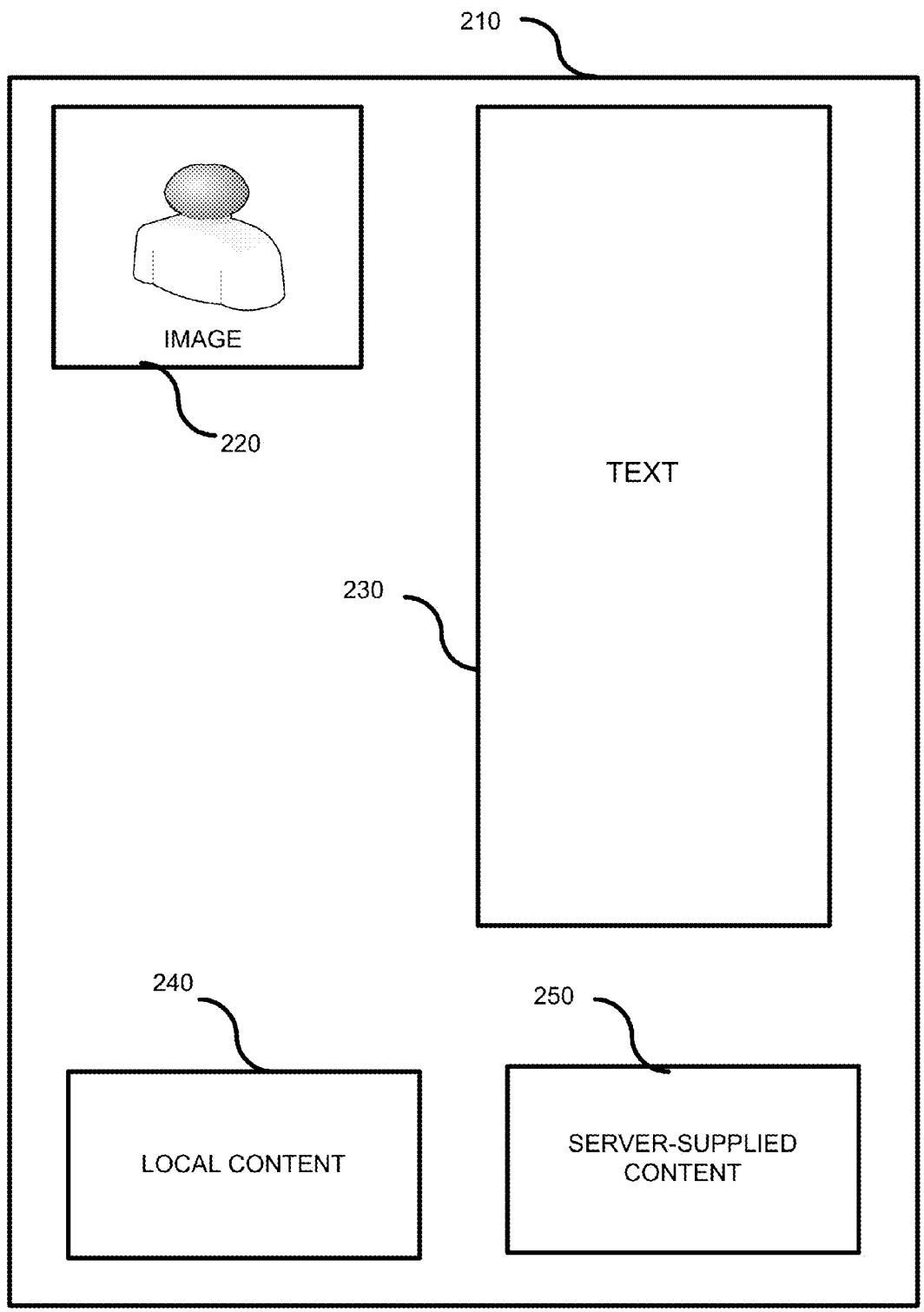
FIG. 2 shows an example page having blended server-supplied UI and client-supplied UI.

FIG. 2 shows an example user interface 210 that can include a combination of images, such as is shown at 220, and text, as is shown at 230. The text can be downloaded XML content that is reformatted into HTML for display. User interface elements 240 and 250 can also be included in the user interface. The user interface elements 240 are sourced by the client, such as from local memory or cache, while the user interface elements 250 are sourced from the server. In both cases, the user interface elements 240, 250 are inserted into an object model prior to rendering the user interface 210. The server-supplied content 250 can include style information so that a portion of the look and feel of the user interface 210 can be controlled by a server computer. Typically, the server-supplied content 250 is in HTML, but other content can be supplied by the server, such as Cascading Style Sheets (CSS), scripting languages (e.g., javascript), etc. The local content 240 can have a look and feel supplied by the client device, while the server-supplied content 250 can have a look and feel controlled by the server computer. Additionally, the server content can inherit style from the local content, if needed.

Figure 3:
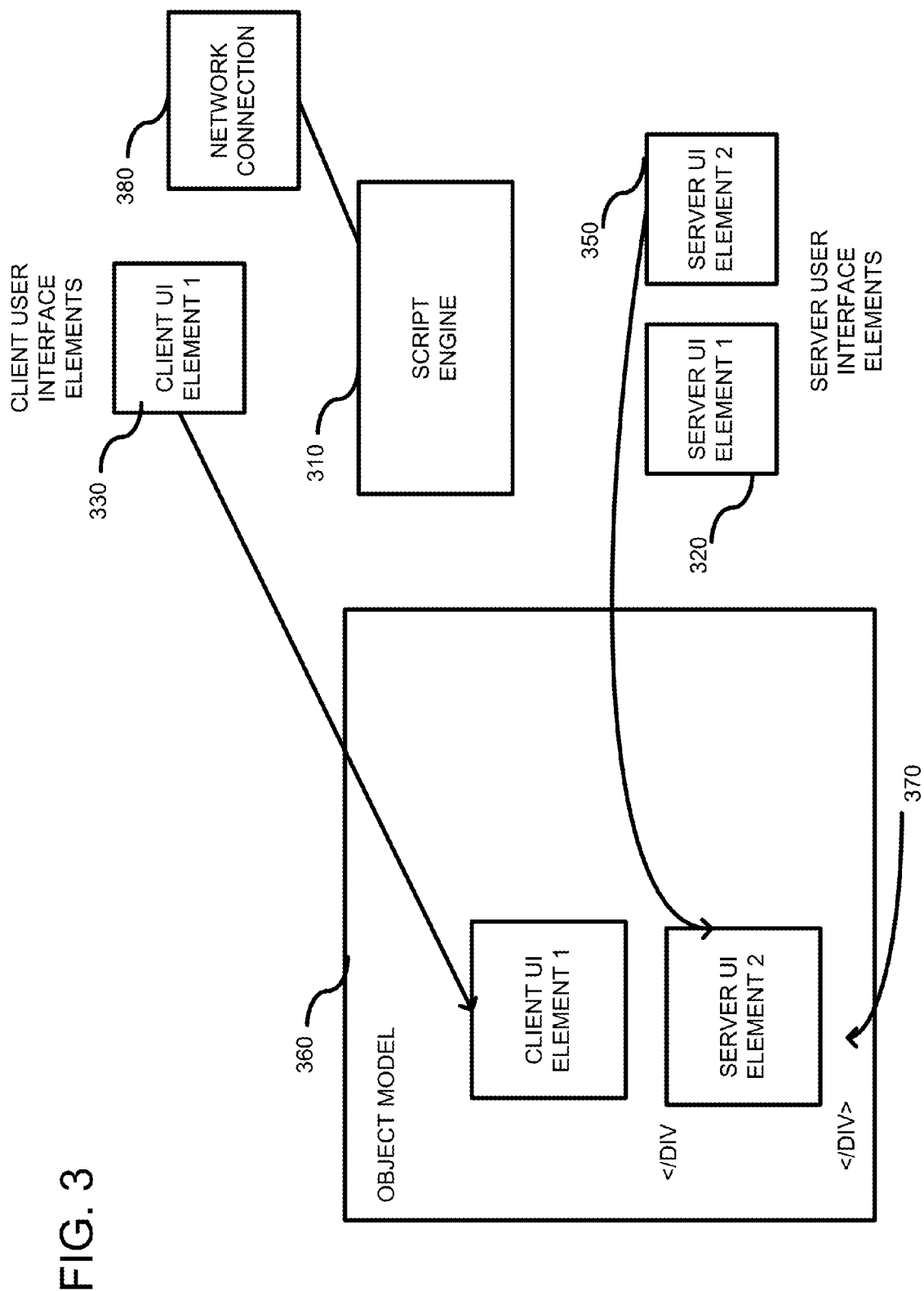
FIG. 3 shows combining server-side and client-side UI elements in an object model.

FIG. 3 shows a script engine 310 that can be executed on the controller 110 (FIG. 1). The script engine 310 can build the object model using various elements sourced from the client and the server. In the simple illustrated example, the script engine 310 can determine that server-supplied UI element 1, shown at 320, is the same as client UI element 1, shown at 330. Thus, the script engine 310 can compare the client-supplied user interface elements with the server-supplied user interface elements, and, if there is a match, can suppress one of the UI elements to reduce redundancy. In the case of FIG. 3, UI element 320 is not copied into the object model or is otherwise removed from the object model. UI element 350 is determined not to be the same as a client supplied UI element. As such, it is copied and inserted into an object model 360. As shown at 370, the UI element 350 can be inserted between tags in the object model. For example, when the object model 360 is a DOM, the tags can be division tags (also called div tags). The script engine 310 can search the object model for the tags and insert the server-supplied UI elements between the div tags. Style information, such as color, font, size or any other look and feel elements can also be inserted in the object model using the tags. Thus, using this structure, the server can control the look and feel of the user interface on a client computer. The script engine 310 can further check a network connection as shown at 380. If the network is currently down, the script can retrieve previously cached server UI elements stored on the client device, or the script engine can suppress the previously received UI elements received from the server computer and expand the client-supplied UI elements. The script engine 310 can further execute a script and manipulate the server supplied UI elements while they are in the object model 360.

Figure 4:
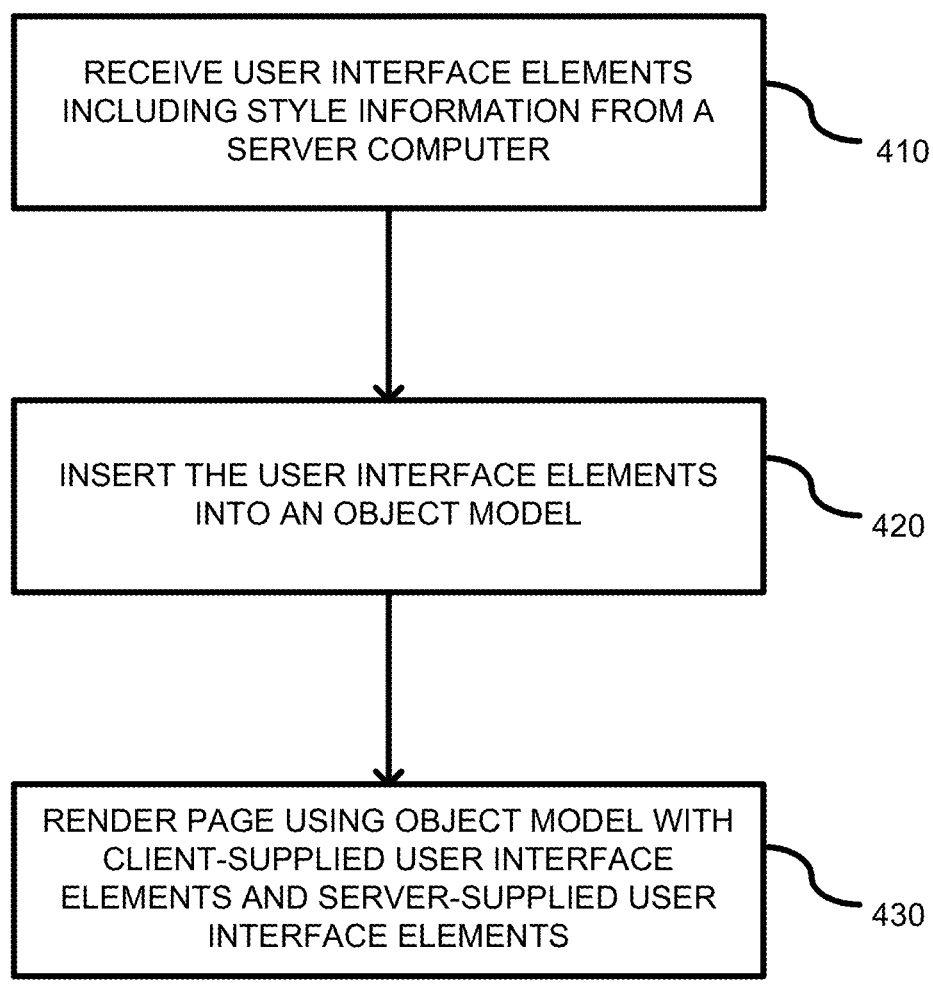
FIG. 4 is a flowchart of a method for inserting server-supplied user interface elements into the Client object model.

FIG. 4 shows a flowchart of a method for combining client-side and server-side UI elements. In process block 410, UI elements including style information for look and feel can be received from a server computer. As previously explained, the UI elements can be in HTML, CSS, javascripts, or any other desired code or data for rendering a page, such as an application page or webpage. In process block 420, the UI elements are inserted into an object model, such as a DOM. By inserting the UI elements in the DOM, the client-supplied UI elements and the server-supplied UI elements are merged into a single model to be rendered. In process block 430, the object model is rendered with the client and server UI elements combined.

Figure 5:
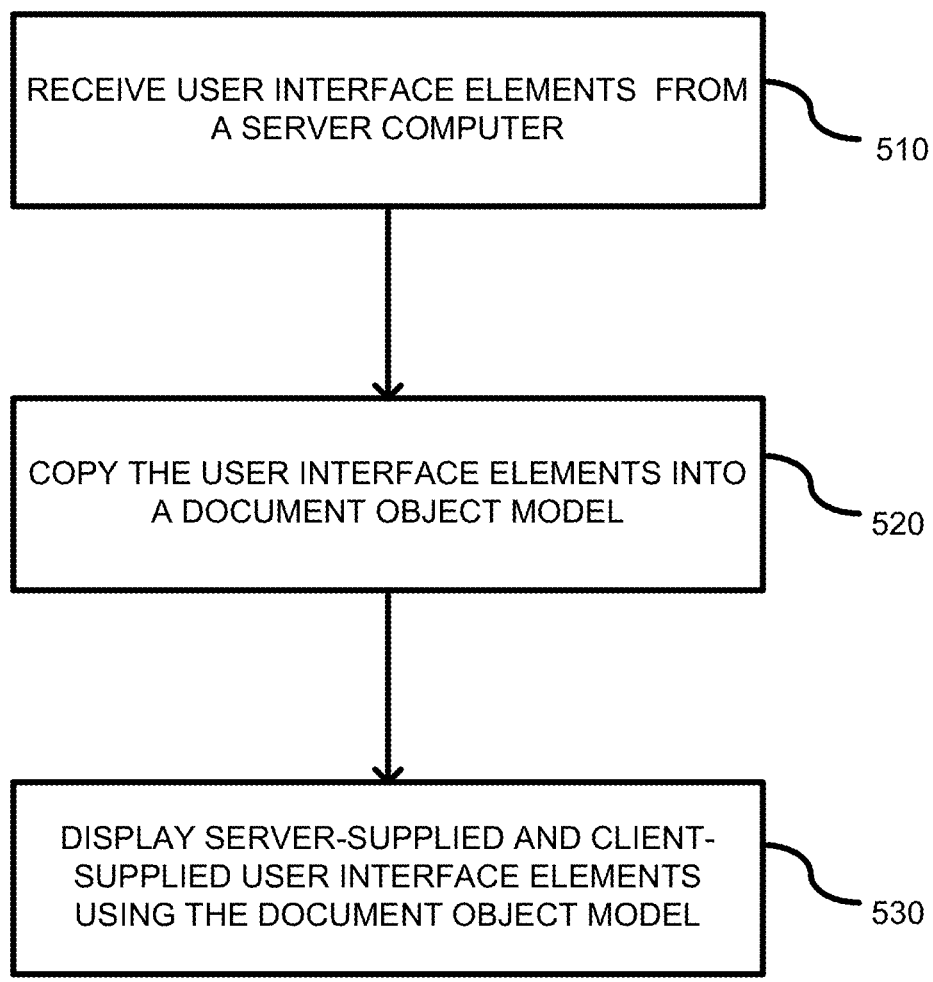
FIG. 5 is a flowchart of a method for inserting server-supplied user interface elements into a Document Object Model.

FIG. 5 is a flowchart of a method for integrating server-supplied UI elements and client-supplied UI elements. In process block 510, user interface elements are received from a server computer. The user interface elements can include executable code, style sheets, content, etc. In process block 520, the UI elements including style information can be copied into a DOM. In process block 530, the server-supplied and client-supplied user interface elements can be displayed in a user interface using the DOM.

Figure 6:
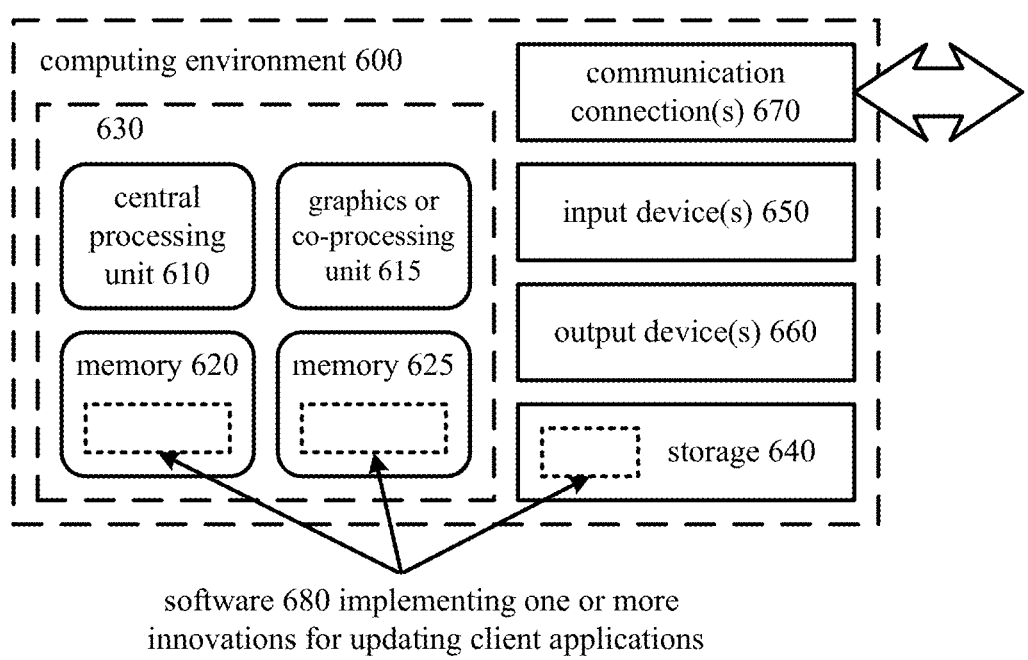
FIG. 6 is an example client computing environment that can be used for any of the embodiments described herein.

FIG. 6 illustrates a generalized example of a suitable computing environment 600 in which several of the described techniques and tools may be implemented. The computing environment 600 is not intended to suggest any limitation as to scope of use or functionality, as the techniques and tools may be implemented in diverse general-purpose or special-purpose computing environments. The computing environment 600 is a client device, which can be a mobile device (e.g., cell phone, smartphone, handheld computer, Personal Digital Assistant (PDA), etc.) or desktop computer.

With reference to FIG. 6, the computing environment 600 includes one or more processing units 610, 615 and memory 620, 625 that can be used in implementing a computing device. In FIG. 6, this most basic configuration 630 is included within a dashed line. The processing units 610, 615 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 6 shows a central processing unit 610 as well as a graphics processing unit or co-processing unit 615. The memory 620, 625 may be volatile memory (e.g., registers, cache, RAM), non-volatile memory (e.g., ROM, EEPROM, flash memory, etc.), or some combination of the two, accessible by the processing unit(s). The memory 620, 625 stores software 680 implementing one or more innovations for combining client and server UI elements.

A computing environment may have additional features. For example, the computing environment 600 includes storage 640, one or more input devices 650, one or more output devices 660, and one or more communication connections 670. An interconnection mechanism (not shown) such as a bus, controller, or network interconnects the components of the computing environment 600. Typically, operating system software (not shown) provides an operating environment for other software executing in the computing environment 600, and coordinates activities of the components of the computing environment 600.

The tangible storage 640 may be removable or non-removable, and includes magnetic disks, magnetic tapes or cassettes, CD-ROMs, DVDs, or any other medium which can be used to store information in a non-transitory way and which can be accessed within the computing environment 600. The storage 640 can store instructions for the software 680 implementing one or more innovations disclosed herein for combining client-supplied and server-supplied UI elements.

The input device(s) 650 may be a touch input device such as a keyboard, mouse, pen, or trackball, a voice input device, a scanning device, or another device that provides input to the computing environment 600. The output device(s) 660 may be a display, printer, speaker, CD-writer, or another device that provides output from the computing environment 600.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, or other carrier.

The techniques and tools can be described in the general context of computer-readable media. Computer-readable media are any available tangible media that can be accessed within a computing environment. By way of example, and not limitation, with the computing environment 600, computer-readable media include memory 620, storage 640, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "select" to describe computer operations in a computing environment. These terms are high-level abstractions for operations performed by a computer, and should not be confused with acts performed by a human being. The actual computer operations corresponding to these terms vary depending on implementation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., non-transitory computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

The disclosed framework allows the client to blend UI elements delivered from the Internet with UI already on the client. This allows for sensitive business logic to be executed on the server, where it is more secure and updatable. These UI elements can then be seamlessly blended with client elements. For example, HTML, CSS and Javascript can be delivered securely from the Internet and injected into Client's DOM. This method allows code delivered from the server to blend with UI elements generated on the client. This is valuable because the client has access to user information that the server does not have.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

We claim:

1. A method of combining server-supplied user interface elements with client-supplied user-interface elements, comprising:

receiving user interface elements including style information from a server computer;

inserting the user interface elements and the style information into a client-supplied object model used to render a page, the client-supplied object model being stored in memory on a user device;

using a script to manipulate the user interface elements supplied by the server in the client-supplied object model;

for viewing by a user on the user device, rendering the page using the object model, wherein the object model includes client-supplied user interface elements and the user interface elements received from the server computer so that both the client-supplied user interface elements and the user interface elements received from the server computer are blended together on the rendered page, with the style information being applied to both the client-supplied user interface elements and the user interface elements received from the server computer.

2. The method of claim 1, wherein the user interface elements and style information from the server computer are in HTML.

3. The method of claim 1, wherein inserting includes searching on a division tag in the client-supplied object model and inserting the user interface elements and style information from the server computer into the division tag.

4. The method of claim 1, wherein the object model is a Document Object Model used for HTML and further including the server computer for transmitting the user interface elements.

5. The method of claim 1, further including checking a network connection and suppressing the user interface elements received from the server computer if there is not a network connection.

6. The method of claim 5, wherein the user interface elements received from the server computer are cached and stored locally on the client device.

7. The method of claim 1, further including comparing the client-supplied user interface elements with the server-supplied user interface elements, and, if there is a match, suppressing at least one of the matching user interface elements.

8. The method of claim 1, further including receiving content from the server computer and inserting the content in the client-supplied object model.

9. The method of claim 8, wherein the content is XML data.

10. A computer-readable nonvolatile storage storing instructions for performing a method of displaying a page on a client device, the method comprising:
   receiving server-supplied user interface elements and style information;
   inserting the server-supplied user interface elements into a client-supplied Document Object Model stored in memory on the client device including client-supplied user interface elements, wherein the inserting includes searching on a division tag in the Document Object Model and inserting the server-supplied user interface elements and style information into the division tag;
   applying the style information to both the server-supplied user interface elements and the client-supplied user interface elements; and
   for viewing by a user, displaying the server-supplied user interface elements with the client-supplied user interface elements on a same page using the Document Object Model on the client device with the applied styling information.

11. The computer-readable media of claim 10, wherein receiving server-supplied user interface elements includes receiving HTML for displaying the server-supplied user interface elements.

12. The computer-readable media of claim 10, further including executing a script on the client device and manipulating the server-supplied user interface elements in the Document Object Model.

13. The computer-readable media of claim 10, further including determining whether the client device is connected to a network and, if not, modifying the DOM to display additional client-supplied user interface elements.

14. An apparatus for displaying a page of content on a client device, comprising:
   a controller on the client device;
   memory for storing a client-supplied object model used to display the page of content, wherein the controller is programmed to receive user interface elements and style information from a server, use a script to manipulate the server-supplied user interface elements, and to insert, using one or more tags in the object model, the received user interface elements and style information, as well as client-supplied user interface elements, in the object model for display; and
   a display for displaying the page of content using the object model including the user interface elements and the style information received from the server computer.

15. The apparatus of claim 14, wherein the object model is a Document Object Model and the user interface elements are in HTML.

16. The apparatus of claim 14, wherein the script uses client data to make decisions about how to manipulate the server-supplied user interface elements.

17. The apparatus of claim 14, wherein the one or more tags include a division tag.

* * * * *